(12) United States Patent
Shirai et al.

(10) Patent No.: US 11,440,061 B2
(45) Date of Patent: Sep. 13, 2022

(54) METHOD FOR REMOVING ADHERING MATTER

(71) Applicant: TOYOTA JIDOSHA KABUSHIKI KAISHA, Toyota (JP)

(72) Inventors: Yasuhiko Shirai, Toyota (JP); Hironobu Matsui, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/937,688

(22) Filed: Jul. 24, 2020

(65) Prior Publication Data

US 2021/0129191 A1    May 6, 2021

(30) Foreign Application Priority Data

Nov. 5, 2019    (JP) .............................. JP2019-200513

(51) Int. Cl.
*B24C 1/04*   (2006.01)
*B08B 3/08*   (2006.01)
*B08B 7/00*   (2006.01)

(52) U.S. Cl.
CPC ................. *B08B 3/08* (2013.01); *B08B 7/00* (2013.01); *B24C 1/04* (2013.01); *B08B 2220/01* (2013.01)

(58) Field of Classification Search
CPC ..... B08B 2220/01; B08B 7/00; B08B 7/0078; B24C 1/083; B24C 1/086
See application file for complete search history.

(56) References Cited

U.S. PATENT DOCUMENTS

| 4,659,391 | A | * | 4/1987 | Kuehn | ...................... B22C 9/18 134/7 |
|---|---|---|---|---|---|
| 4,662,425 | A | * | 5/1987 | Musschoot | .......... B22D 29/005 134/7 |
| 4,991,360 | A | * | 2/1991 | DeSpain | ................ B24B 31/003 451/104 |
| 5,911,488 | A | * | 6/1999 | Geromini | .............. F26B 3/0926 34/430 |
| 2014/0000831 | A1 | * | 1/2014 | Mindock, III | ......... B22D 19/00 164/15 |
| 2018/0133762 | A1 | * | 5/2018 | Vermeulen | ............ B08B 7/0078 |

FOREIGN PATENT DOCUMENTS

JP    2012-179643 A    9/2012

* cited by examiner

*Primary Examiner* — Natasha N Campbell
(74) *Attorney, Agent, or Firm* — Oblon, McClelland, Maier & Neustadt, L.L.P.

(57) ABSTRACT

An adhering matter removing method for removing adhering matter on a surface of an article includes the step of immersing a target surface of the article into a fluidized bed.

6 Claims, 2 Drawing Sheets

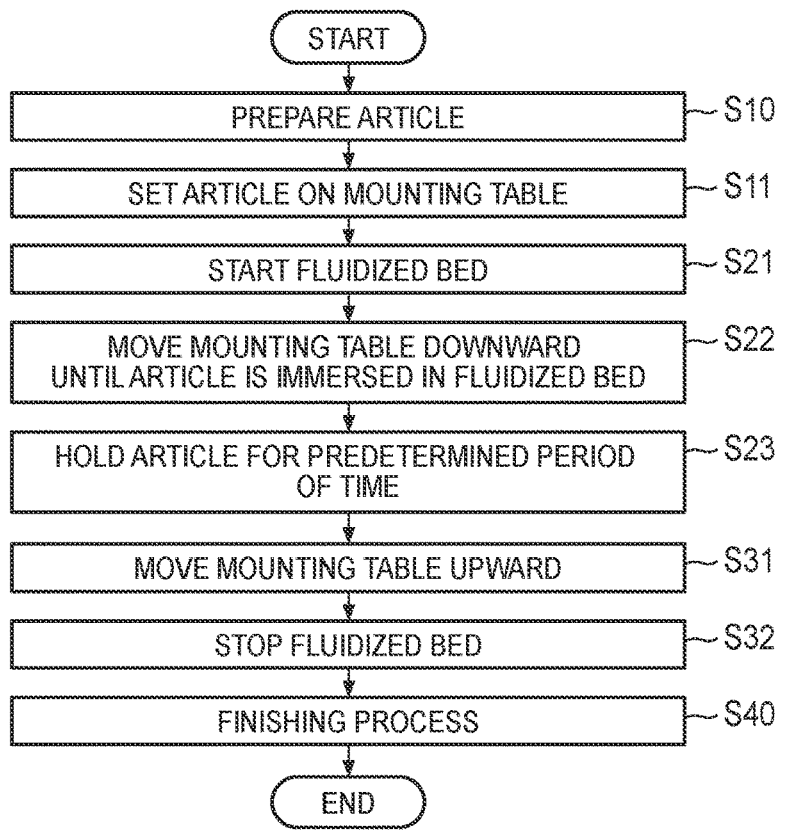
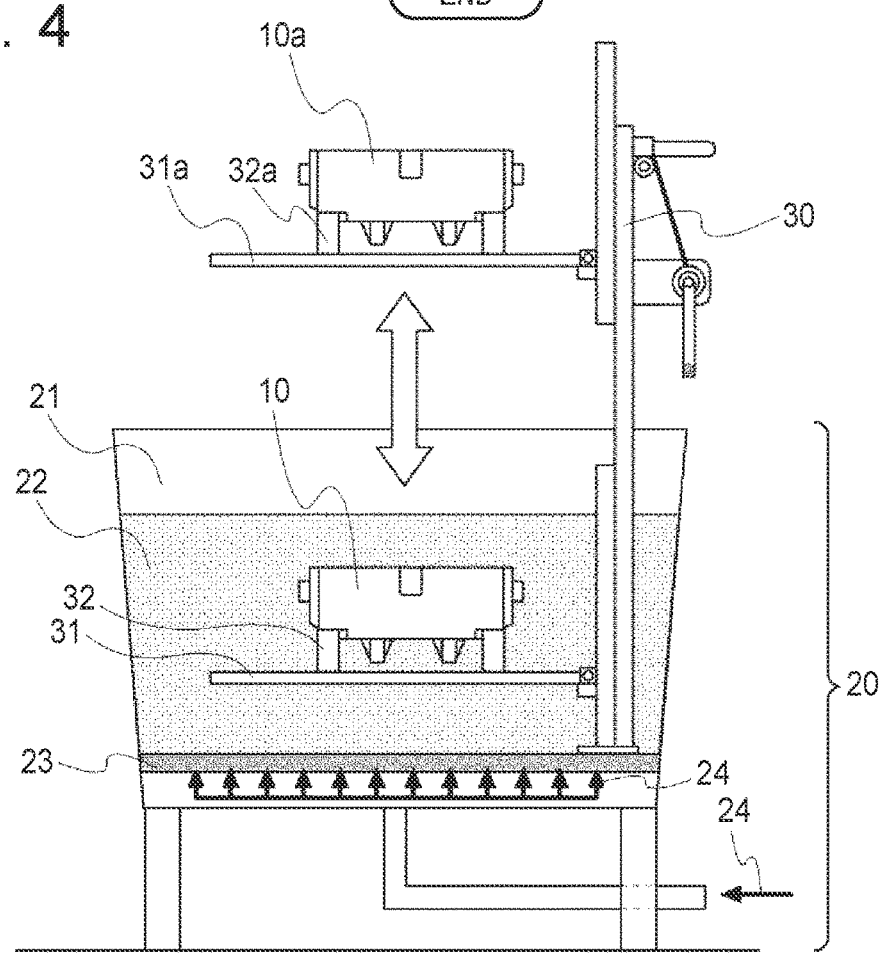

METHOD FOR REMOVING ADHERING MATTER

CROSS-REFERENCE TO RELATED APPLICATION

This application claims priority to Japanese Patent Application No. 2019-200513 filed on Nov. 5, 2019, incorporated herein by reference in its entirety.

BACKGROUND

1. Technical Field

The disclosure relates to an adhering matter removing method.

2. Description of Related Art

As a core for casting, a molded object which contains a powder such as sand and a binding agent such as a resin binder and in which the powder is bound by the binding agent is widely used. On the other hand, 3D printers are used to produce various articles. One example of the method for 3D printers is a powder fixing lamination method in which a powder and a binding agent are used to produce a powder molded object. In recent years, it is considered to form a core as described above using such a 3D printer.

Japanese Unexamined Patent Application No. 2012-179643 (JP 2012-179643 A) discloses that a compressed gas is used to clean a mold in a cast product taking-out/core setting device for taking a cast product out of a mold and setting a core in the mold.

SUMMARY

During the process of producing a powder molded object, uncured powder may adhere to surfaces of the molded object. In particular, in a 3D printer as described above, when an article after molding is taken out, uncured powder tends to adhere to the article. The powder is usually removed manually using a brush or the like. This is a time-consuming operation. Examples of possible methods for removing adhering matter include air blowing and shot blasting, but uneven cleaning occurs or the article itself is ground by the medium for shot blasting depending on the shape or material of the article.

The disclosure solves such a problem, and provides an adhering matter removing method that allows easy removal of adhering matter.

An adhering matter removing method according to the disclosure is a method for removing adhering matter on a surface of an article, characterized by including the step of immersing a target surface of the article in a fluidized bed.

According to the adhering matter removing method, because adhering matter adhering to a target surface is removed using a fluidized bed, the adhering matter can be easily removed. It is, therefore, possible to shorten the time for removal and prevent uneven cleaning.

In the adhering matter removing method, the step of immersing may include the steps of placing the article on a mounting table and moving the mounting table downward until the article is immersed in the fluidized bed.

In the adhering matter removing method, the article may be a molded object including a powder and a binding agent.

In the adhering matter removing method, the article may be a molded object obtained by a powder fixing lamination method.

In the adhering matter removing method, the article may be a core for casting.

By the disclosure, an adhering matter removing method that allows easy removal of adhering matter is provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a flowchart showing another example of an adhering matter removing method according to this embodiment; and FIG. 4 is a schematic sectional view illustrating one example of an apparatus for use in the adhering matter removing method in FIG. 3.

DETAILED DESCRIPTION OF EMBODIMENTS

A mode for carrying out the disclosure is hereinafter described with reference to the drawings. However, the disclosure is not limited to the following embodiments. Also, for clarity of the description, the following description and the drawings are simplified as appropriate.

Figure 1:
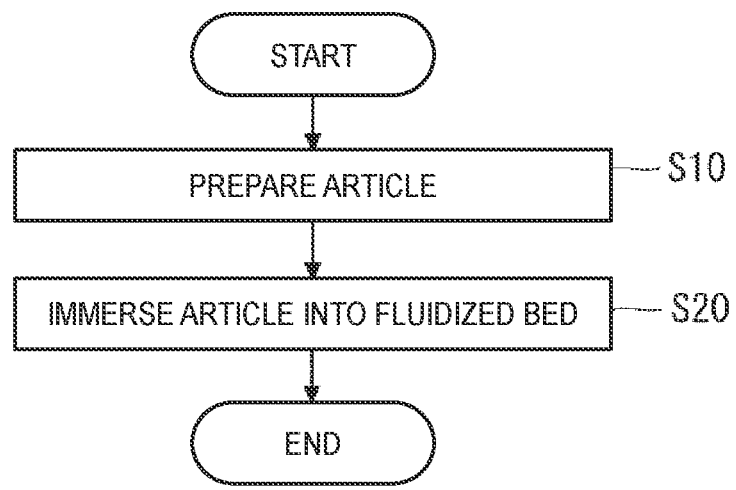
FIG. 1 is a flowchart showing one example of an adhering matter removing method according to this embodiment.

FIG. 1 is a flowchart showing one example of an adhering matter removing method according to this embodiment (which may be referred to also as "this adhering matter removing method"). This adhering matter removing method needs to include at least the step of immersing a target object for removal of adhering matter in a fluidized bed (S20), and usually further includes the step of preparing the target object (S10).

Figure 2:
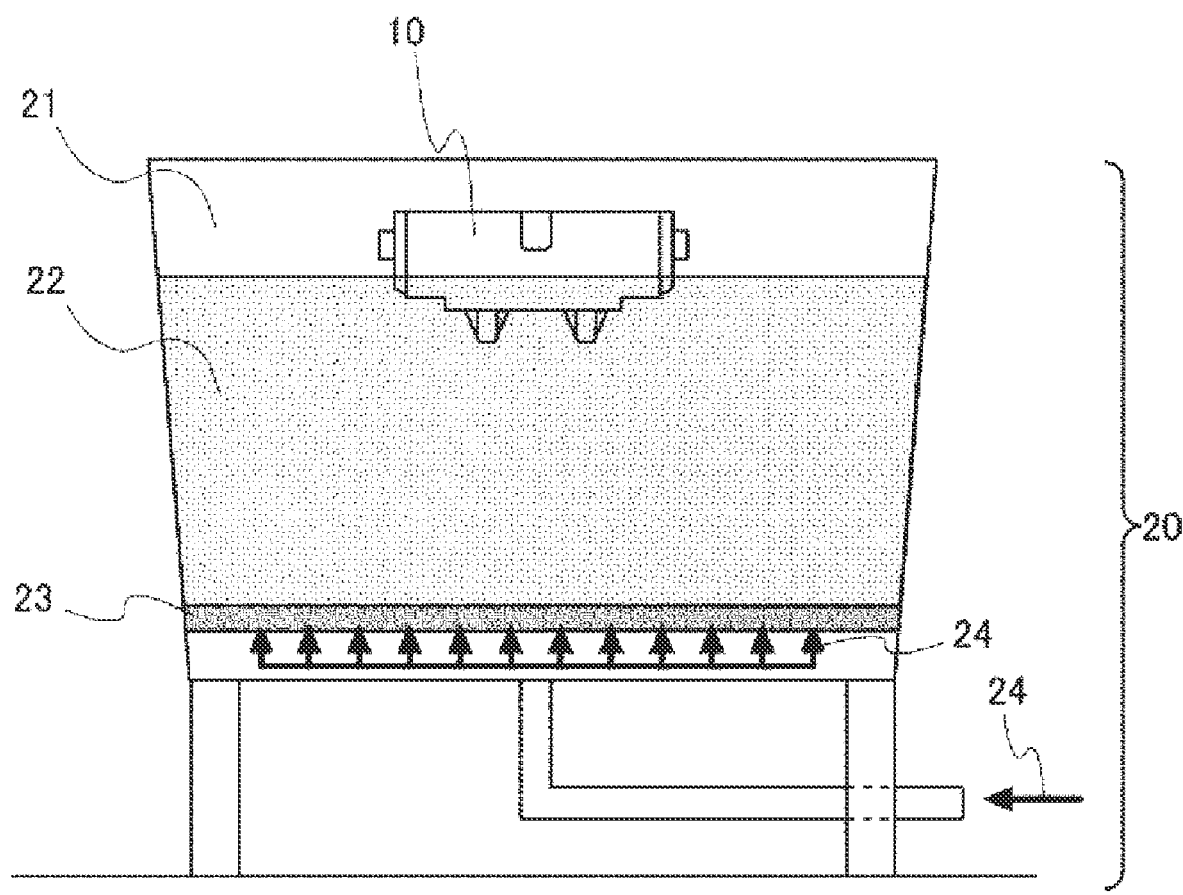
FIG. 2 is a schematic sectional view illustrating one example of a state where an article has been immersed in a fluidized bed.

FIG. 2 is a schematic sectional view illustrating one example of a state where an article 10 has been immersed in a fluidized bed 22. In the disclosure, a fluidized bed is a bed in a state where solid particles are suspended and floated in a fluid and where the solid particles behave like a fluid. In the example of a fluidized bed unit 20 shown in FIG. 2, a tank 21 contains solid particles, and a gas 24 is blown through a bottom of the tank 21 into the solid particles through a filter 23 to cause the solid particles to function as the fluidized bed 22.

In this adhering matter removing method, when an adhering matter removing target surface of the article 10 is immersed in the fluidized bed 22, the solid particles with high fluidity come into contact with the target surface. At this time, the adhering matter on the target surface is ground off or the target surface is polished until the adhering matter is removed.

According to this adhering matter removing method, removal of adhering matter can be easily achieved as described above. According to this method, the time necessary to remove adhering matter can be shortened. Also, according to this method, because the solid particles of the fluidized bed enter deep into even an article with a complex shape, adhering matter is removed with less uneven removal of adhering matter. Further, according to this method, because the solid particles come into gentle contact with an article compared to shot blasting or the like, problems such as chipping, breakage and excessive grinding of the article can be prevented even when the article is a relatively fragile article such as a powder molded object.

The target object for this adhering matter removing method is an article having adhering matter to be removed on at least a part of its surface. The material of the article is not particularly limited, and may be plastic, metal, or the like. This adhering matter removing method is suitably applicable to a relatively fragile article such as a molded object including a powder and a binding agent because this adhering matter removing method does not cause breakage or the like of an article even in the case of a relatively fragile article as described above. The molded object is a molded object in which powder is bound by a binding agent, for example. Examples of the powder include sand and gypsum. Examples of the binding agent include resin binders, and examples of the resin binders include thermoplastic resins. Also, this adhering matter removing method is easily applicable to an article with a complex shape as described above. These facts indicate that this adhering matter removing method is particularly suited to a core for casting. The adhering matter may be dust and stains as well as uncured powder.

The molded object may be prepared by a method in which a mixture of a powder and a binding agent is filled into a predetermined mold to form an object, produced using a 3D printer for a powder fixing lamination method, or prepared by other known methods, for example.

A powder fixing lamination method is a method for obtaining a molded object. First, a powder is spread to a thickness corresponding to one layer on a shaping stage, and a binding agent is applied in a predetermined shape on the powder by an inkjet method or the like and cured. Then, additional powder corresponding to one layer is again spread on the first layer, and the second and subsequent layers are formed in the same manner. While a molded object obtained by the powder fixing lamination method tends to have uncured powder adhering to its surfaces, the powder can be easily removed by this adhering matter removing method.

The immersion in the fluidized bed may be carried out such that only the target surface of the article is immersed with the target surface facing downward (facing toward the fluidized bed) (see FIG. 2), for example, or the entire article may be immersed in the fluidized bed (see FIG. 4). The immersion of the article is preferably carried out after the solid particles are brought into the state of the fluidized bed 22 by activating the fluidized bed unit 20. When the article is immersed after the solid particles are brought into a fluidized bed state, even a fragile article or an article having a thin portion is prevented from being broken because the resistance exerted on the article during the immersion is significantly reduced. The article may be immersed in the fluidized bed by moving a mounting table on which the article has been placed downward as described later, or an article held by hands may be immersed in the fluidized bed.

In the example in FIG. 2, the fluidized bed unit 20 includes the tank 21, which contains solid particles (or the fluidized bed 22), the filter 23, a pipe through which a gas 24 is introduced, and so on. The gas 24 is blown through a bottom of the tank 21 into the solid particles through the filter 23 to cause the solid particles to function as the fluidized bed 22. Examples of the solid particles include sand. As the filter 23, a porous filter that allows the gas 24 to pass through it but does not allow the solid particles to pass through it is used. Specific examples of the filter 23 include a sintered filter. Examples of the gas 24 include air and nitrogen gas.

The adhering matter removing performance of the fluidized bed can be adjusted by changing the particle size of the solid particles or the flow rate of the gas.

The duration for which the article is immersed in the fluidized bed may be adjusted as appropriate based on factors such as the state of the adhering matter, and a sufficient removing effect can be achieved with 1 to 2 minutes' immersion, for example.

During the immersion, the article may be kept stationary or may be shaken to such a degree that the article is not broken. When the article is shaken, the adhering matter removing effect is further improved. Examples of the method for shaking the article include a method in which a mounting table (see FIG. 4), which is described later, is shaken using a known vibrator, knocker, cylinder, or the like.

After the article is taken out of the fluidized bed, a finishing process may be carried out on the article when necessary. Examples of the finishing process include manual removal of adhering matter. Because most of adhering matter is removed by this adhering matter removing method, the removal of adhering matter as a finishing process can be carried out within a short period of time. Various inspections such as visual inspection of the article may be further carried out on the article.

In the following, one example of a more specific embodiment is described with reference to FIG. 3 and FIG. 4, but this is not intended to limit the disclosure to the following embodiment. This adhering matter removing method can select and employ part or all of the following specific embodiment.

FIG. 3 is a flowchart showing another example of an adhering matter removing method according to this embodiment. FIG. 4 is a schematic sectional view illustrating one example of an apparatus for use in the adhering matter removing method in FIG. 3.

The example in FIG. 4 is different from the example in FIG. 2 in that a lifter 30 is equipped. The lifter 30 includes a mounting table 31 on which the article 10 is placed, and a retainer 32. In FIG. 4, the article before immersion, the mounting table, and the retainer are designated by reference numerals 10*a*, 31*a* and 32*a*, respectively.

The mounting table 31 preferably has openings for easy contact between the fluidized bed 22 and the article 10. Specific examples include a net-like material, a frame-like material, and a perforated metal.

The retainer 32 is used to prevent the article from overturning, and to reduce the contact area between the article and the mounting table to enhance the adhering matter removing effect. In addition, the retainer 32 is suitably used to place an article having a markedly uneven target surface with the uneven surface facing downward. The retainer 32 may be adjusted as appropriate depending on the shape of the article 10. When a perforated metal is used for the mounting table 31, the retainer 32 can be adjusted easily for articles with different shapes when a retainer having protuberances corresponding in pitch to that of the openings of the perforated metal is used as the retainer 32. When the article is a powder molded object or the like, it is preferred to provide a cushioning material on a surface of the retainer 32 with which the article is brought into contact. Examples of the cushioning material include urethane materials and rubber materials.

In the embodiment shown in FIG. 3, an article is first prepared (S10), and the article is set on the mounting table 31 (including the retainer 32) (S11). Then, the fluidized bed unit is activated to bring the solid particles into the state of the fluidized bed 22 (S21), and the lifter 30 is activated to move the mounting table 31 downward until the article 10 is immersed in the fluidized bed (S22). After the immersion state is maintained for a predetermined period of time to remove adhering matter (S23), the lifter 30 is activated to move the mounting table upward (S31), and the fluidized bed 22 is stopped (S32). Then, a finishing process (S40) is carried out on the article taken out, whereby this adhering matter removing method is completed. In this embodiment, the processes in S21 to S32 may be automated, in which case removal of adhering matter can be achieved more easily.

As described above, according to this adhering matter removing method, the time necessary to remove adhering matter can be shortened. According to this adhering matter removing method adhering matter can be easily removed even from an article with a complex shape. According to this adhering matter removing method, adhering matter can be removed even from a target object of a relatively fragile shape or material without causing breakage of the article.

What is claimed is:

1. An adhering matter removing method for removing adhering matter on a surface of an article, the method comprising:
    a step of immersing a target surface of the article into a fluidized bed; and
    a step of shaking the article during immersion to remove the adhering matter,
    wherein the step of immersing includes the steps of placing the article on a mounting table and moving the mounting table downward until the article is immersed in a fluidized bed,
    wherein the step of shaking includes shaking the mounting table, and
    wherein the article is a molded object including a powder and a binding agent.

2. The method according to claim 1, wherein during the step of immersing the article, the target surface is faced in a direction of the fluidized bed, and
    wherein the target surface of the article comprises less than an entire outer surface of the article, and only the target surface of the article is immersed into the fluidized bed.

3. An adhering matter removing method for removing adhering matter on a surface of an article, the method comprising:
    a step of immersing a target surface of the article into a fluidized bed; and
    a step of shaking the article during immersion to remove the adhering matter,
    wherein the step of immersing includes the steps of placing the article on a mounting table and moving the mounting table downward until the article is immersed in a fluidized bed,
    wherein the step of shaking includes shaking the mounting table, and
    wherein the article is a molded object obtained by a powder fixing lamination method.

4. The method according to claim 3, wherein during the step of immersing the article, the target surface is faced in a direction of the fluidized bed, and
    wherein the target surface of the article comprises less than an entire outer surface of the article, and only the target surface of the article is immersed into the fluidized bed.

5. An adhering matter removing method for removing adhering matter on a surface of an article, the method comprising:
    a step of immersing a target surface of the article into a fluidized bed; and
    a step of shaking the article during immersion to remove the adhering matter,
    wherein the step of immersing includes the steps of placing the article on a mounting table and moving the mounting table downward until the article is immersed in a fluidized bed,
    wherein the step of shaking includes shaking the mounting table, and
    wherein the article is a core for casting.

6. The method according to claim 5, wherein during the step of immersing the article, the target surface is faced in a direction of the fluidized bed, and
    wherein the target surface of the article comprises less than an entire outer surface of the article, and only the target surface of the article is immersed into the fluidized bed.

* * * * *